(12) United States Patent
Schneider-Hufschmidt

(10) Patent No.: US 6,836,543 B1
(45) Date of Patent: Dec. 28, 2004

(54) OPERATING SURFACE FOR CLASS FUNCTIONS IN A TELEPHONE

(75) Inventor: Matthias Schneider-Hufschmidt, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/600,061
(22) PCT Filed: Dec. 11, 1998
(86) PCT No.: PCT/DE98/03647
  § 371 (c)(1),
  (2), (4) Date: Jul. 10, 2000
(87) PCT Pub. No.: WO99/35804
  PCT Pub. Date: Jul. 15, 1999

(30) Foreign Application Priority Data

Jan. 8, 1998 (DE) ......................................... 198 00 458

(51) Int. Cl.$^7$ ............................................... H04M 1/27
(52) U.S. Cl. .................. 379/352; 379/207.11; 379/165; 379/354
(58) Field of Search ............................. 379/352, 368, 379/369, 207.02, 207.11, 157, 165, 354, 422, 423, 914, 915

(56) References Cited

U.S. PATENT DOCUMENTS 4,453,040 A * 6/1984 Wolf et al. ............. 379/357.04
5,054,058 A * 10/1991 Kakizawa .................... 379/157

FOREIGN PATENT DOCUMENTS

EP 0 419 948 4/1991
EP 0 503 257 9/1992

OTHER PUBLICATIONS

Andreasen, et al., "ADSI: The Dawn of a New Age of Interactive Services", Telesis, vol. 30, No. 97, Dec. 1, 1993, pp. 35–50.

* cited by examiner

Primary Examiner—Xu Mei
Assistant Examiner—Daniel Swerdlow
(74) Attorney, Agent, or Firm—Bell Boyd & Lloyd LLC

(57) ABSTRACT

An operating surface for CLASS functions of a telephone device of an analog network. The operating surface has two functions, "activate" and "deactivate", so that the command sequence following the "activate" function is interpreted as CLASS function and is turned on and the following command sequence is interpreted as CLASS function and turned off with the "deactivation" function.

12 Claims, 1 Drawing Sheet

OPERATING SURFACE FOR CLASS FUNCTIONS IN A TELEPHONE

The present invention is directed to an operating surface for CLASS functions in a telephone terminal device. In particular, the present invention is directed to an operating surface for CLASS functions in an analog telephone of an analog network and to a telephone device having such an operating surface.

What are referred to as CLASS functions are being currently introduced into analog telephone networks. These are ISDN-like functions such as call forwarding, brokering, call waiting, etc. The employment of such CLASS functions in an analog telephone network harbors the difficulty that the network generally does: not supply an answerback that can be interpreted by the terminal device. Only a spoken message or an acknowledge tone, which the user but not the terminal device can interpret, is sent via the voice channel. In other words, the desired CLASS function is available given a positive acknowledge signal of the network—which is referred to below as positive feedback—, whereas the requested CLASS function is not available given a negative acknowledge signal—referred to below as negative feedback. Since the answerback of the network cannot be interpreted by the terminal: device, the terminal device, accordingly, generally does not know whether the requested performance feature of the CLASS function is available or not, i.e. the terminal device has no knowledge about the network status relating to it. It is therefore difficult to visually present the corresponding network function, CLASS function in the terminal device, for example with a text or icon, in a dependable way, this presenting no difficulty given a terminal device for an ISDN network.

In traditional operating surfaces of an enhanced-feature telephone device, the CLASS functions are usually controlled via menu entries. In normal telephone devices, dedicated keys or speed dialing keys that can be programmed by the user are employed for this purpose. Such a solution is disadvantageous since keys of the telephone device must be offered for the CLASS functions, which the user rarely uses: under certain circumstances. Over and above this, the user would like to have as many speed dialing keys as possible available, so that a conflict of objectives arises due to the limited space available on the telephone device, namely as many speed dialing keys as possible, on the one hand, and special keys for CLASS functions, on the other hand. Further, a dependable visualization of the network status cannot be undertaken on the telephone device since the device has no reliable information about the network status. Since the device information cannot be matched with the network status, incorrect displays can therefore occur at all terminal devices.

European Patent Application No. 0 19 948 is directed to a method for the initiation of switching-oriented functions and services with keys of telephone stations having a main memory and alphanumerical an display. After actuation of a first special key, all functions and services are thereby successively called and presented on the display. By actuating a second special key, the functions or, services indicated on the display are realized.

European Patent Application No. 0 503 257 is directed to a device for the operation of a telephone apparatus comprising a selection key and an implementation key that are both connected to an evaluation means. Specific functions are selected from a memory area with the selection key, these being subsequently implemented with the implementation key.

Andreasen et al., "ADSI: THE DAWN OF A NEW AGE OF INTERACTIVE SERVICES", TELESIS, Vol. 30, No. 97, 1 Dec. 1993, pp. 3550, describes CLASS functions in analog networks (ADSI: Analog Display Services interface).

SUMMARY OF THE INVENTION

The present invention is therefore based on the object of creating an operating surface for CLASS functions of a telephone device of an analog network and a telephone device having such an operating surface with which simple operation is enabled and that resolves the conflict between the highest possible number of speed dialing keys and the necessary keys for the CLASS functions.

This object is inventively achieved in accordance with the present invention in an operating surface for CLASS functions of a telephone device of an analog network, said operating surface comprising: an activation function selection for enabling a command sequence following selection of the activation function selection to be interpreted as a CLASS function until disabled; and a deactivation function selection for disabling interpretation of a command sequence as a CLASS function following selection of the deactivation function selection.

Inventively, an operating surface for CLASS functions of a telephone device of an analog network comprises the two functions "activate" and "deactivate", so that the command sequence following the function "activate" is interpreted as CLASS function and the following "CLASS function" is turned off with the function "deactivate".

In an embodiment the "activate" function is employed for controlling the executive function sequence of a complex "CLASS function".

In an embodiment, the "activate" and "deactivate" functions are employed by the user for signalling the network status to the telephone device, so that the telephone device can correctly visualize the network status, for example via a text display or an icon.

In an embodiment, the "activate" and "deactivate" functions are preferably realized by fixed keys of the telephone device; however, the functions can also be realized as display elements of a picture screen that are activated via a corresponding selection with a cursor, for example a mouse. A selection via a voice input is also possible.

In an embodiment, the CLASS functions of the operating surface are preferably formed by programmable keys. In an embodiment, the keys of the CLASS functions are employed as speed dialing keys when the "activate" or, "deactivate" function is not turned on.

In a preferred embodiment of the invention, present two fixed keys are employed in the operating surface for the "activate" and "deactivate" functions and up to 14 programmable keys are employed for the CLASS functions, so that a total of 16 keys are employed.

In an embodiment, the operating surface preferably comprises a display for the presentation of the icons, the numbers of calling parties (CLIP functionality), speed dialing occupation of the programmable keys, etc. The display of the telephone device is preferably employed as display. Further, the operating surface can comprise an active field. The active field can likewise be designed as an electronic display.

In an embodiment list of the incoming is preferably be maintained in the operating surface, whereby the list is preferably organized as FIFO. Direct calls can be placed proceeding from the list.

In an embodiment the list of operating calls is maintained in a memory.

This object is also achieved in accordance with the present invention in a telephone device for an analog network comprising: an operating surface for CLASS functions of a telephone device of an analog network, said operating surface having: an activation function selection for enabling a command sequence following selection of said activation function selection to be interpreted as a CLASS function until disabled; and a deactivation function selection for disabling interpretation of a command sequence as a CLASS function following selection of said deactivation function selection.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1:
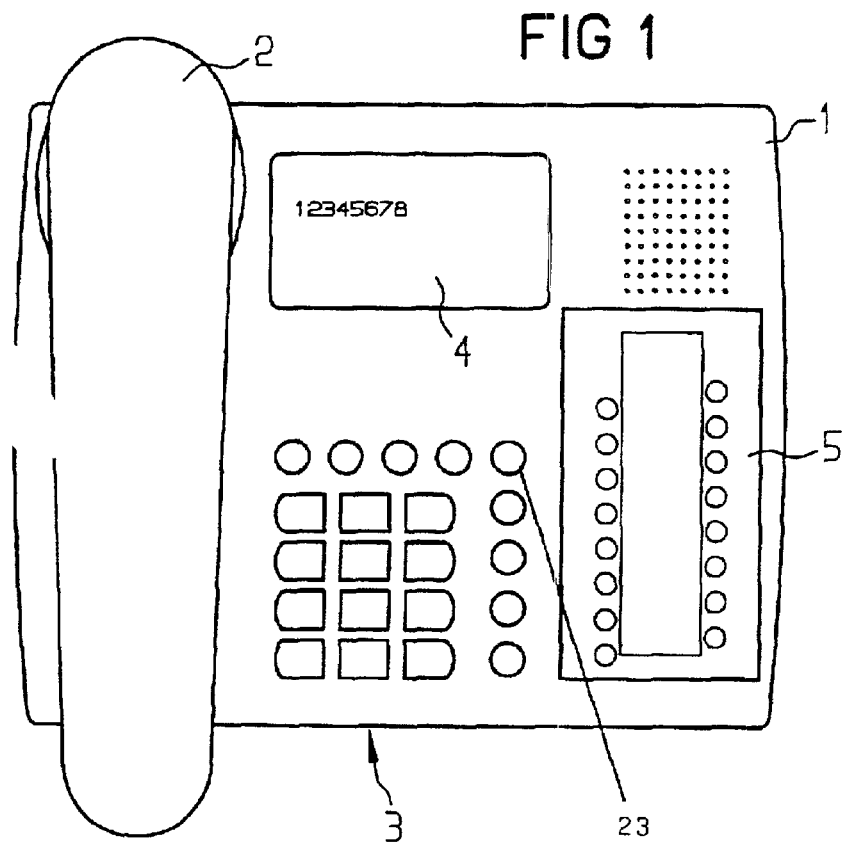
FIG. 1 is a schematic illustration of an operating surface utilized in a telephone device constructed in accordance with the present invention.

FIG. 1 shows a telephone device 1 with an earphone 2, a standard telephone keyboard 3 with auxiliary functions as well as a display 4. The telephone device 1 also comprises and additional operating surface 5 for the CLASS functions.

Figure 2:
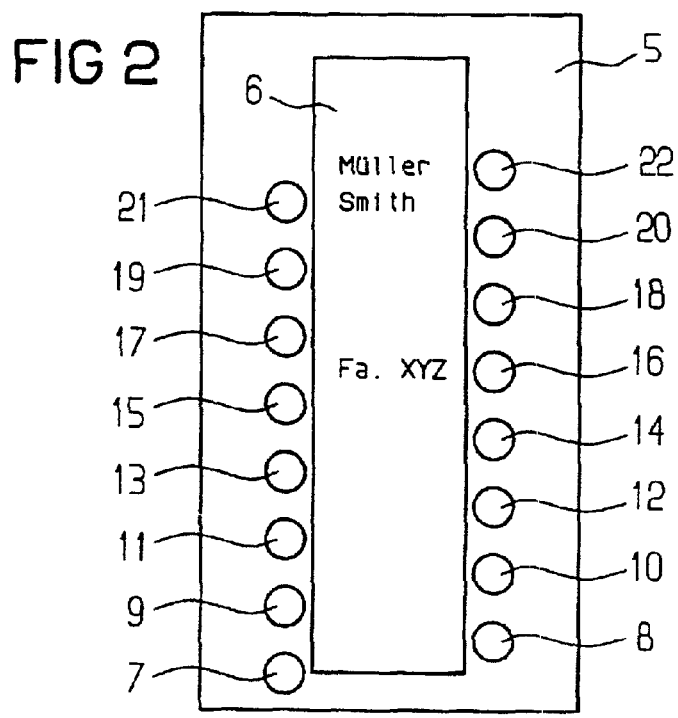
FIG. 2 shows the operating surface of FIG. 1 in an enlarged illustration.

FIG. 2 shows an enlarged illustration of the operating surface 5. The operating surface 5 comprises an active field 6, whereby respectively 8 keys are arranged to the left and right of the active field 6, i.e. a total of 16 keys. Of these, the respectively lower key 5, 7, 8 of the two rows are fixed keys that are occupied with the "activate" and "deactivate" functions. As already explained, the key 7 having the "activate" function serves mainly for initiating a CLASS function, whereas the key 8 with the "deactivate" functions turns the CLASS function off. The remaining 14 keys are programmable and, in view of their employment as CLASS function keys, can be occupied with, for example, the following CLASS functions:

Key 9: FWD Uncond
Key 11: WD busy
Key 13: FWDNoReply
Key 15: Cancel FWD
Key 17: CW (call waiting)
Key 19: Direct Call
Key 21: Automatic Redial
Key 10: Reject
Key 12: Accept
Key 14: Swap
Key 16: Conference
Key 18: Transfer
Key 20: CLIR
Key 22: not occupied.

The programmable keys 9–22 are doubly occupied, whereby the double functions are controlled via the "activate" and "deactivate" keys. When no CLASS functions are activated, i.e. the key 7 in the exemplary embodiment is not pressed, then the keys 9–22 serve as speed dialing keys that are occupied with the telephone numbers the user has programmed in. These telephone numbers can be displayed on the active field 6 of the operating surface 5 at the level of the corresponding key. When the active field 6 is designed as electronic display, these information can be displayed thereat. Icons and/or numerals are displayed on the display 4 shown in FIG. 1, so that the status of the device or, of the network can be visualized.

The keys of the "activate" and "deactivate" functions preferably differ in color from the other keys. For example, the function key 7 "activate" is designed in the color green, whereas the function key 8 "deactivate" is implemented in the color red.

The CLASS functions utilized here are the 4 CF (call forwarding) functions CFU (call forwarding unconditioned, key 9), CFB (call forwarding busy, key 11), CFN (call forwarding no reply, key 13) and general deactivation (key 15).

The CLASS functions CLIR (calling line identification restriction, key 20), CW (call waiting, key 17), fixed destination call (direct call, key 19), automatic redial (key 21), as well as the 5 brokering functions R0 through R4 (keys 10, 12, 14, 16 and 18) are also realized.

Examples of the operating sequence of a telephone device provided with such an operating surface are presented below:

I. Activation of a CLASS function in the case of a positive feedback:
1. Pick up receiver,
2. Press green key 7 ("activate" function),
3. Press desired function key,
4. Potential input of the PIN and other necessary data at the cursor position,
5. Ending the string of Point 4 by:
   waiting 5 seconds or
   manual input of # or
   pressing the green key 7,
6. In case of a positive feedback:
   hang up receiver or
   wait 5 seconds or press the green key 7.

II. Activation of a CLASS function in the case of a negative feedback:
1. Pick up receiver,
2. Press green key 7 ("activate" function)
3. Press desired function key,
4. Potential input of the PIN and other necessary data at the cursor position,
5. Ending the string of Point 4 by:
   waiting 5 seconds or
   manual input of # or
   pressing the green key 7,
6. In case of a negative feedback:
   pressing the red key 8 within 5 seconds.

III. Deactivating a CLASS function in the case of a positive feedback:
1. Pick up receiver,
2. Press red key 8 ("deactivate" function),
3. Press desired function keys,
4. Potential input of the PIN and other necessary data at the cursor position,
5. Ending the string of Point 4 by:
   waiting 5 seconds or
   manual input of # or
   pressing the green key 7, 6. In the case of a positive feedback:
   hang up receiver or
   wait 5 seconds or
   press the green key 7.

IV. Deactivating a CLASS function in the case of a negative feedback:
1. Pick up receiver,
2. Press red key 8 ("deactivate" function),
3. Press desired function key,
4. Potential input of the PIN,
5. Ending the string of Point 4 by:
   waiting 5 seconds or
   manual input of # or
   pressing the green key 7,
6. In the case of a negative feedback:
   pressing the red key 8 within 5 seconds.

Further, a list of the received calls is maintained, whereby all received calls are stored, whether they were successful or not. This list is preferably realized as FIFO, whereby the list covers a maximum of 10 entries in the preferred embodiment. Repetitions, i.e. repeat calls of the same calling party, are removed from the list, so that the list only contains the last call of this calling party in this case. Unsuccessful call attempts can be optically displayed by the flashing or lighting of a call list key.

The call list can be fetched by actuating a key 23, "Call List". In this first status, the numbers of the calling parties are displayed and the user can scroll through the list by renewed pressing of the key 23 "Call List". When no activity is indicated in this first status for a predetermined time, for example 30 seconds, or when the red key 8 is pressed, then this first status is exited and the operating surface returns into the idle condition.

By pressing the green key 7, the operating surface switches from a first into a second status wherein additional information about the call in the list being viewed at the moment is displayed. By pressing the red key 8 or as a result of non-activity for a second predetermined time span, for example 5 seconds, the operating surface returns into the first status.

By pressing the green key 7 again within a predetermined period of time (for example, 5 seconds), the operating surface switches into a third status, the dialing status, wherein the attempt to set up a connection to the corresponding number is undertaken.

Although modifications and changes may be suggested by those of ordinary skill in the art, it is the intention of the inventors to embody within the patent warranted hereon all changes and modifications as reasonably and properly come within the scope of their contribution to the art.

I claim:

1. An operating surface for CLASS functions of a telephone device of an analog network, said operating surface comprising:

an activation function selection for enabling a command sequence following selection of said activation function selection to be interpreted as a CLASS function until disabled; and a deactivation function selection for disabling interpretation of a command sequence as a CLASS function following selection of said deactivation function selection.

2. The operating surface according to claim 1, wherein said activation function selection is for controlling an executive function sequence of a complex CLASS function.

3. The operating surface according to claim 1, wherein said activation function selection and said deactivation function selection are for signaling network status.

4. The operating surface according to claim 1, wherein said activation function selection is a first fixed key; and wherein said deactivation function selection is a second fixed key.

5. The operating surface according to claim 1, further comprising:
   a number of programmable keys each for a CLASS function.

6. The operating surface according to claim 5, wherein said programmable keys of said CLASS functions are for employment as speed dialing keys when said activation function selection has not been selected.

7. The operating surface according to claim 5, wherein said activation function selection is a first fixed key; and wherein said deactivation function selection is a second fixed key; and wherein said programmable keys comprise fourteen programmable keys for said CLASS functions.

8. The operating surface according to claim 1 further comprising:
   a display.

9. The operating surface according to claim 1, further comprising:
   a memory for maintaining a list of incoming calls.

10. The operating surface according to claim 9, wherein said list is maintained as FIFO.

11. The operating surface according to claim 9, wherein a direct call can be placed proceeding from said list.

12. A telephone device for an analog network comprising:
   an operating surface for CLASS functions of a telephone device of an analog network, said operating surface having:
      an activation function selection for enabling a command sequence following selection of said activation function selection to be interpreted as a CLASS function until disabled; and
      a deactivation function selection for disabling interpretation of a command sequence as a CLASS function following selection of said deactivation function selection.

* * * * *